US010778008B2

(12) United States Patent
Levy et al.

(10) Patent No.: US 10,778,008 B2
(45) Date of Patent: Sep. 15, 2020

(54) METHOD AND PROCESS FOR ACQUIRING AND DELIVERING ELECTRIC VEHICLE OWNER-OPERATOR PREFERENCE DATA WHICH IS USED TO SCHEDULE AND REGULATE THE CHARGING OF MULTIPLE ELECTRIC VEHICLE BATTERIES WITHIN A SHARED LOCAL POWER DISTRIBUTION NETWORK

(76) Inventors: Paul S. Levy, Chandler, AZ (US);
Edward Butler, Gilbert, AZ (US);
John C. Thomas, Beaverton, OR (US)

( * ) Notice: Subject to any disclaimer, the term of this patent is extended or adjusted under 35 U.S.C. 154(b) by 781 days.

(21) Appl. No.: 13/072,777

(22) Filed: Mar. 28, 2011

(65) Prior Publication Data
US 2012/0253567 A1 Oct. 4, 2012

(51) Int. Cl.
| | |
|---|---|
| *H02J 3/14* | (2006.01) |
| *H02J 13/00* | (2006.01) |
| *H02J 7/00* | (2006.01) |
| *B60L 53/63* | (2019.01) |
| *B60L 53/68* | (2019.01) |

(52) U.S. Cl.
CPC ............... *H02J 3/14* (2013.01); *B60L 53/63* (2019.02); *B60L 53/68* (2019.02); *H02J 7/0027* (2013.01); *H02J 13/0075* (2013.01); *B60L 2240/70* (2013.01); *Y02B 70/3225* (2013.01); *Y02B 90/2653* (2013.01); *Y02E 60/721* (2013.01); *Y02T 10/7005* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y04S 10/126* (2013.01); *Y04S 20/222* (2013.01); *Y04S 20/224* (2013.01); *Y04S 30/12* (2013.01); *Y04S 40/126* (2013.01)

(58) Field of Classification Search
CPC ........ H02J 3/14; H02J 7/0027; H02J 13/0075; B60L 53/68; B60L 53/63; B60L 2240/70; Y02B 70/3225; Y02B 90/2653; Y02E 60/721; Y02T 10/7005; Y02T 10/7055; Y02T 10/7088; Y02T 10/7291; Y02T 90/121; Y02T 90/128; Y02T 90/14; Y02T 90/16; Y02T 90/163; Y02T 90/168; Y04S 10/126; Y04S 20/222; Y04S 20/224; Y04S 30/12; Y04S 50/126
See application file for complete search history.

(56) References Cited

U.S. PATENT DOCUMENTS

| | | | |
|---|---|---|---|
| 8,106,627 B1* | 1/2012 | Rossi .................. | B60L 11/1816 320/109 |
| 2009/0040029 A1* | 2/2009 | Bridges .................. | H02J 3/008 340/12.37 |
| 2009/0062967 A1* | 3/2009 | Kressner ............... | B60W 10/26 700/286 |

(Continued)

*Primary Examiner* — Sze-Hon Kong

(57) ABSTRACT

As the density of Electric Vehicle deployments in residential neighborhoods increase, demand on local power grids may exceed the local utility power supply causing local brown outs or transformer failure. The invention describes a method and process which enables the acquisition and efficient RF transmission of data that enables utility customers, utilities and/or other controlling entities to collaboratively regulate the timing and rate of Electric Vehicle battery charging in a manner that avoids peak-load related transformer failures.

1 Claim, 3 Drawing Sheets

(56) References Cited

U.S. PATENT DOCUMENTS

| | | | |
|---|---|---|---|
| 2009/0063680 A1* | 3/2009 | Bridges | B60L 53/57 709/224 |
| 2009/0091291 A1* | 4/2009 | Woody | B60L 53/63 320/109 |
| 2010/0017249 A1* | 1/2010 | Fincham | B60L 3/12 705/412 |
| 2010/0134067 A1* | 6/2010 | Baxter | B60L 3/12 320/109 |
| 2010/0141204 A1* | 6/2010 | Tyler | B60L 55/00 320/109 |
| 2010/0145837 A1* | 6/2010 | Graziano et al. | 705/34 |
| 2010/0185357 A1* | 7/2010 | Mizumachi | 701/33 |
| 2010/0280675 A1* | 11/2010 | Tate, Jr. | B60L 53/63 700/295 |
| 2011/0109266 A1* | 5/2011 | Rossi | H02J 13/0062 320/109 |
| 2011/0175569 A1* | 7/2011 | Austin | 320/109 |
| 2011/0191220 A1* | 8/2011 | Kidston et al. | 705/34 |
| 2011/0202418 A1* | 8/2011 | Kempton | G06Q 20/22 705/26.1 |
| 2012/0109519 A1* | 5/2012 | Uyeki | 701/439 |
| 2012/0109798 A1* | 5/2012 | Shelton et al. | 705/34 |
| 2012/0112696 A1* | 5/2012 | Ikeda et al. | 320/109 |
| 2012/0229082 A1* | 9/2012 | Vukojevic | H02J 7/00 320/108 |
| 2012/0229089 A1* | 9/2012 | Bemmel et al. | 320/109 |
| 2012/0235646 A1* | 9/2012 | Lo et al. | 320/137 |
| 2013/0026986 A1* | 1/2013 | Parthasarathy | H02J 3/14 320/109 |
| 2013/0179061 A1* | 7/2013 | Gadh et al. | 701/123 |
| 2013/0221918 A1* | 8/2013 | Hill et al. | 320/109 |
| 2013/0268132 A1* | 10/2013 | Pratt et al. | 700/286 |

\* cited by examiner

METHOD AND PROCESS FOR ACQUIRING AND DELIVERING ELECTRIC VEHICLE OWNER-OPERATOR PREFERENCE DATA WHICH IS USED TO SCHEDULE AND REGULATE THE CHARGING OF MULTIPLE ELECTRIC VEHICLE BATTERIES WITHIN A SHARED LOCAL POWER DISTRIBUTION NETWORK

FIELD OF THE INVENTION

The present invention relates the power distribution networks, in particular electrical grid power demand control and load management associated with electric vehicle battery charging.

BACKGROUND

As the number Electric Vehicles deployed increase the likely hood for several of these Electric Vehicles being housed within the same local area and connect to common utility transformer become more likely. There is a high probability that multiple Electric Vehicles will require recharging at the same time. This increased load on a common connected transformer will likely present an overload condition due to the inadequate sizing of the existing transformer infrastructure and would cause the transformer to fail resulting in power distribution failure.

When multiple electric vehicle charging systems are active, peak demands can overlap increasing overall demand of the central supply point (the local distribution transformer). The only means to protect the central point supply is to coordinate each separate peak load domain so they do not overload the central supply point (i.e. the utility power transformer).

Control within each independent load domain is determined by its own EV battery charging policy, which can be influenced by variable electricity rate plans (for example time-of-use pricing) as set by a utility or third party service. By exerting external control within each independent domain, a specific pre-negotiated re-charge policy can be exercised, thus the total load of the single point supply can be predicted and managed.

SUMMARY OF THE INVENTION

In accordance with one aspect of the invention, there is provided a connection between the electric vehicle and the electric vehicle charge station which contains two way communication as well as transference of power that is used to charge the electric vehicle.

In accordance with another aspect of the invention, there is provided a communication connection between electric vehicle and the electric vehicle charge station which provides control information from the electric vehicle to the electric vehicle charge station and status information from the electric vehicle charge station back to the electric vehicle.

In accordance with another aspect of the invention, there is provided a wireless radio contained within the electric vehicle that is used to transmit and receive status and control information by means of a cellular communication system to a remotely located computer system that contains analytical programs and database tables that describe the local power distribution network properties that the electric vehicle charge station is connected to also known as a demand response aggregator (which can be a utility or an authorized third party).

In accordance with a further aspect of the invention a method is provided for controlling both charge rate and start time of a charge event used to charge electric vehicle by means of sending command and control information from a demand response aggregator based on power distribution topology that has been predefined from the location of the vehicle as well as the electric vehicle charge station ID and location.

The above summary of the present invention is not intended to describe each illustrated embodiment, or every implementation, of the present invention. This is the purpose of the figures and the detailed description which follow.

BRIEF DESCRIPTION OF THE FIGURES

Other aspects and advantages of the invention will become apparent upon reading the following detailed description and upon reference to the drawings in which.

DETAILED DESCRIPTION OF THE INVENTION

In the following detailed description numerous specifics are set forth in order to provide a thorough understanding of the present invention. However, the present invention may be used without understanding many of these specific details.

Figure 1:
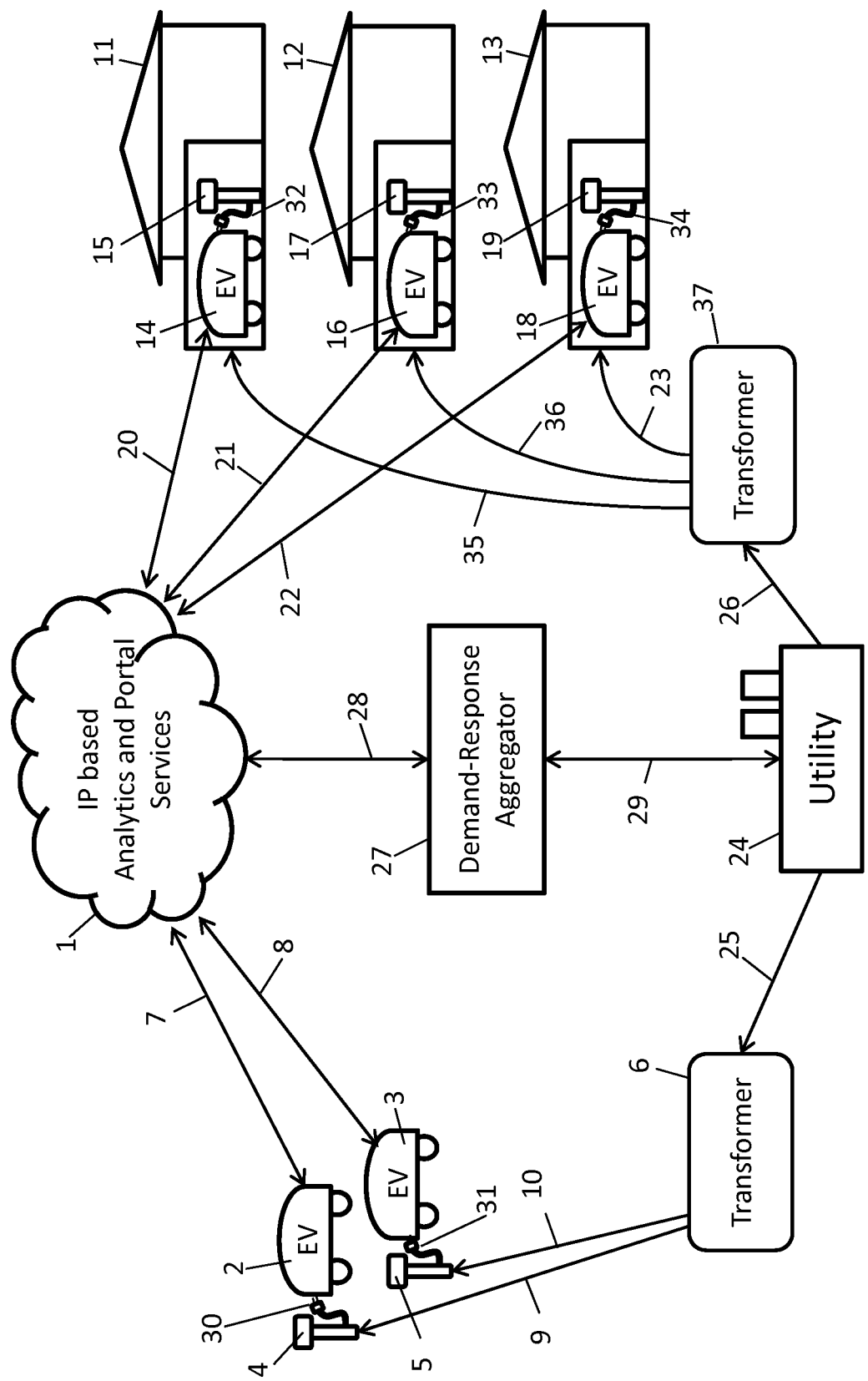
FIG. 1. Is a functional block diagram illustrating the connection between the Utility Distribution Transformer, Electric Vehicle Service Equipment, communication paths and the demand response aggregator.

Turning to the drawings, FIG. 1 illustrates the step down distribution transformer 6, 37 which connects to the utility 24 by means of transmission lines 25 and 26. The utility transformer 6 defines a central distribution point which supplies public electric vehicle charge stations 4, 5 by means of connection 9, 10. Electric vehicles 2, 3 are connected to the electric vehicle charge station 4, 5 by means of cable 30, 31 which contains both a bidirectional communication data path and power used to charge electric vehicles battery. Cellular radios within electric vehicle 2, 3 communicate status and control data through cellular service indicated by wireless connection paths 7, 8 to a cloud portal 1 which provides a status and control data through connection to the demand response aggregator 27 by means of connection 28. Two way Data communications between the utility and the demand response aggregator is transmitted by means of connection 29.

As will become apparent from the description herein one aspect of the invention provides a means for control of the total power that the utility transformer 6 would be supplying by sending control information to determine the charge rate and or start time to charge stations 4 and charge station 5 for the purpose of limiting overall demand based on the ability of transformer 6 to supply current coupled with the ability of connection 25 to support transformers 6 current requirements from utility 24 through use of control information from the demand response aggregator 27

In another specific embodiment, home residences 11, 12, 13 are connected to transformer 37 by means of connection 35, 36, 23. Step down distribution transformer 37 receives power from utility 24 by means of connection 26. Electric vehicle charge stations that are connected to electric vehicle 14, 16, 18 by means of bidirectional data and power connections 32, 33, 34 respectively receive their power from each residence 11,12,13 respectively. Cellular radios within electric vehicle 14,16,18 communicate status and control data through cellular service indicated by wireless connection paths 20,21,22 to a cloud portal 1 which provides a status and control data through connection to the demand response aggregator 27 by means of connection 28. Data from the utility is forwarded to the demand response aggregator by means of connection 29.

It will also become apparent from description herein another aspect of the invention provides means for control incremental power demand to transformer 37 by obtaining load status information from and send control commands to charge stations 15, 17, 19 through the communication data path established by electric vehicles plugged into each charge station.

Figure 2:
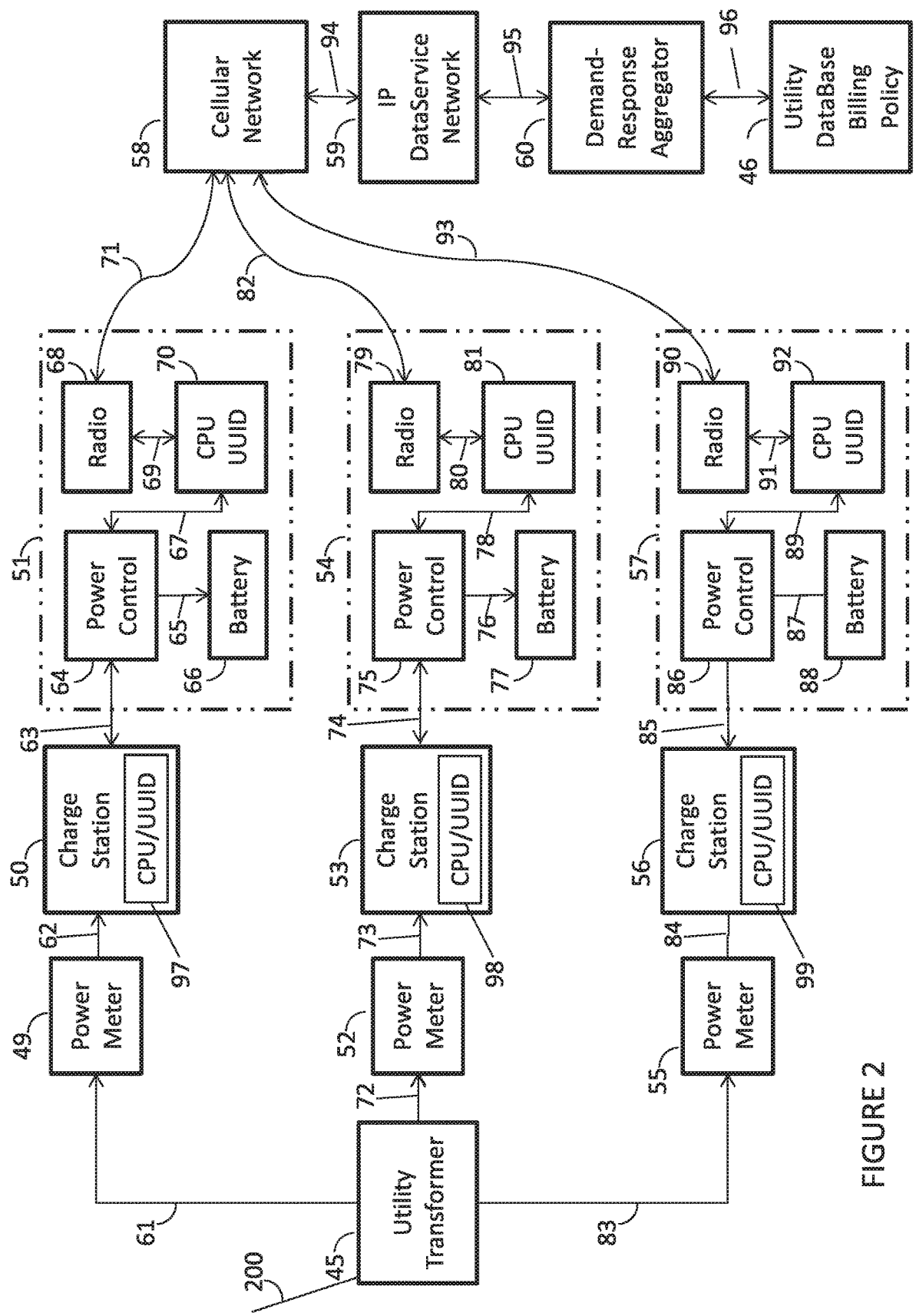
FIG. 2. Is a functional block diagram illustrating the relationship of the power distribution network and the wireless connection between the electric vehicle(s) and the Demand Response aggregation servers.

FIG. 2 illustrates a specific embodiment of the demand response interconnection between the utility customer (i.e. EV owner) and the utility and/or utility demand response aggregator 60 that is enabled by a data services network 59.

The data services network 59 facilitates the acquisition of utility customer preference data for electric vehicle charging (e.g. when the vehicle is needed and priority time frames for battery charging) and then transfers this data via a commercial cellular network 58 to the utility and/or aggregator 60.

This data is delivered in pre-defined time intervals, in a form that enables the utility and/or utility demand response aggregator 60 to optimize electric vehicle charging schedules and requirements using their proprietary methodology for achieving electrical load balance on the local electric network.

The data services network 59 then facilitates the delivery of control parameters using a commercial cellular network 58 connections to the electric vehicle cellular radios 68, 79, 90 embedded in the electric vehicles 51,54,57 respectively, to the charge stations 50, 53, 56 respectively in order to enable the desired load balancing in harmony with the utility customers' preferences.

Other aspects of this specific embodiment as shown in FIG. 2 are three power meters 49,52,55 each connected to utility transformer 45 by means of 61,72,83 respectively that provides power to the charge stations 50, 53, 56 respectively by means of connection 62, 73, 84 respectively. The utility transformer 45 receives grid power by connection 200. Charge station 50, 53, 56 are uniquely identified by means of the unique user ID (UUID) located within the CPU control board 97, 98, 99 respectively.

There are three electric vehicles 51, 54, 57 that are connected to charge station 50, 53, 56 respectively by means of a bidirectional connection 63, 74, 85 respectively.

Electric vehicle 51 is being charged by means of connection 63 gated by power control 64 into battery 66 by means of connection 65. Power status and battery condition is monitored by CPU 70. CPU 70 along with its unique user ID (UUID) is used to communicate to the utility by means of radio 68 using wireless connection 71 to cellular network 58 which forwards information using connection 94 into data network services and server farm 59. This information is then forwarded to the utility demand response aggregation 60 by means of connection 95.

Electric vehicle 54 is being charged by means of connection 74 gated by power control 75 into battery 77 by means of connection 76. Power status and battery condition is monitored by CPU 81. CPU 81 along with its unique user ID (UUID) is used to communicate to the utility by means of radio 79 via wireless connection 82 to cellular network 58 which forwards information using connection 94 into data network services and server farm 59. This information is then forwarded to the utility demand response aggregation 60 by means of connection 95. The demand response aggregator 60 receives power network characteristics of utility transformer 45 and demand/policy information from utility 46 via 96.

Electric vehicle 57 is connected to charge station 56 by means of bidirectional connection 85. Electric vehicle 57 is not taking a charge due to a specific command from the demand response aggregator 60 through connection 95 through data network services 59 through connection 94 through cellular network 58 through wireless connection 93 through radio 90 which is contained within the electric vehicle 57 through connection 91 to control CPU 92 that contains unique user ID (UUID) that matches the address of the command.

Figure 3:
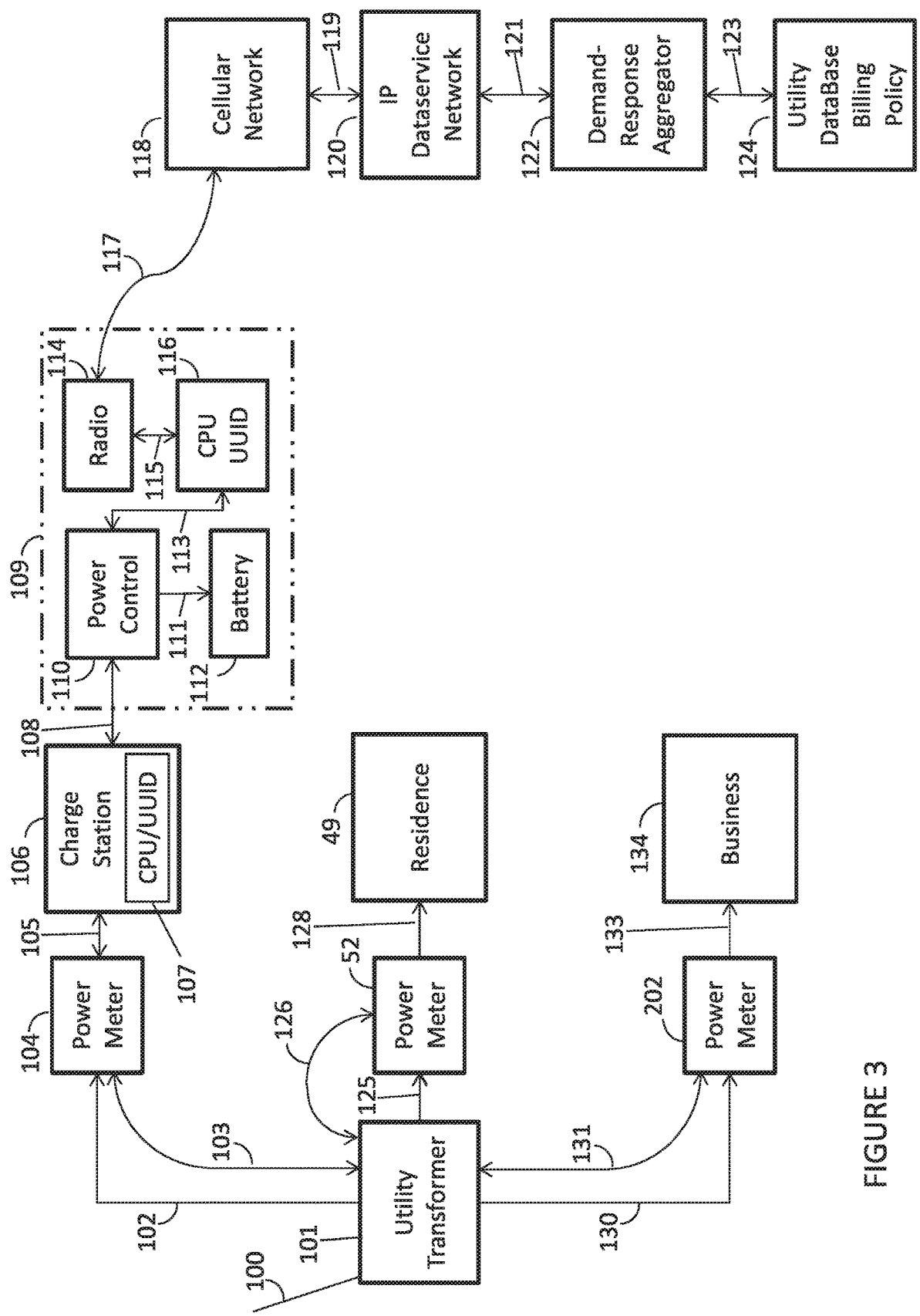
FIG. 3. Is a functional block diagram illustrating the relationship between residences and businesses connected to the same utility transformer and associated communication paths between these residences and businesses to and from the demand response aggregators through the electric vehicle attached cellular network

FIG. 3 illustrates an implementation of the invention, that embodies the interconnection between multiple residences and businesses that are connected to a common utility transformer 101 which received great power via connection 100. Smart power meter 104 receives utility power via connection 102 and Powerline or Wireless data indicated by connection 103. Residence 49 is connected to Smart power meter 52 by 128. Smart power meter 52 receipts utility power via connection 125 and Powerline or Wireless data indicated by connection 126. Business 134 is connected to smart power meter 202 which received utility power via connection 130 and Powerline or Wireless data indicated by connection 131.

Each smart meter in this network can communicate to each other current demand that each one is measuring within this Powerline or Wireless data network. Communication of this data back to the demand response aggregator 122 is facilitated by connection 105 contains powerline or Wireless data to charge station 106 pack and process powerline data via CPU 107 coupled with its unique user ID that identifies the user. This information is then forwarded via connection 108 to the power control 110 which is embedded in the electric vehicle 109 through computer 116 which contains the electric vehicle user's unique ID this data is then routed through connection 115 Cellular Radio 114 which transmits the requested data via wireless connection 117 to the Cellular network 118 through IP connection 119 through data services 120 through IP connection 121 to demand response aggregator 122. The demand response aggregator 122 receives power network characteristics of utility transformer 101 and demand/policy information from utility 124 via 123. The demand response aggregator 122 and then sends control information to electric vehicle 109 on the reverse data path allowing the electric vehicle 109 to ask for charge from charge station 106 using connection 108.

The foregoing description of the preferred embodiment of the invention should be considered as illustrative and not as limiting. Various changes and modifications will occur to those skilled in the art without departing from the true scope of the invention as defined in the appended claims.

The invention claimed is:
1. A system for coordinating electric vehicle charging events, the system comprising:
a computing system for each of a plurality of electric vehicles, the computing system comprising a first processor configured to
transmit, to a remote server via a wireless communication link, vehicle charging data for the respective electric vehicle, wherein the vehicle charging data includes at least one of a unique identification code for the respective electric vehicle, a current battery charge level, charging time preferences, and a next time of use for the electric vehicle,
receive, from the remote server via the wireless communication link, a charge control signal for a charging station of a plurality of charging stations, wherein the charging station is electrically connected to the respective electric vehicle, and
initiate, responsive to receiving the charge control signal from the remote server, a charging event between the respective electric vehicle and the charging station; and
the remote server for coordinating charging events between the plurality of electric vehicles and the plurality of charging stations, wherein the remote server comprises a second processor configured to
receive, from the computing system of the respective electric vehicle via the wireless connection link, the vehicle charging data for the respective electric vehicle,
receive, from a second remote server of a power supply entity, power network characteristics of at least one transformer providing power to the plurality of charging stations,
determine, based in part on the vehicle charging data and the power network characteristics, a charging schedule for the plurality of electric vehicles, wherein the charging schedule is load balanced between a portion of the plurality of charging stations, and
transmit, to the computing system of the respective electric vehicle, the charge control signal for the charging event between the respective electric vehicle and the charging station, wherein the charge control signal is based on the charging schedule for the plurality of electric vehicles.

* * * * *